G. JESSUP.
Seed-Dropper.
No. 2,782
Reissued Oct. 22. 1867.
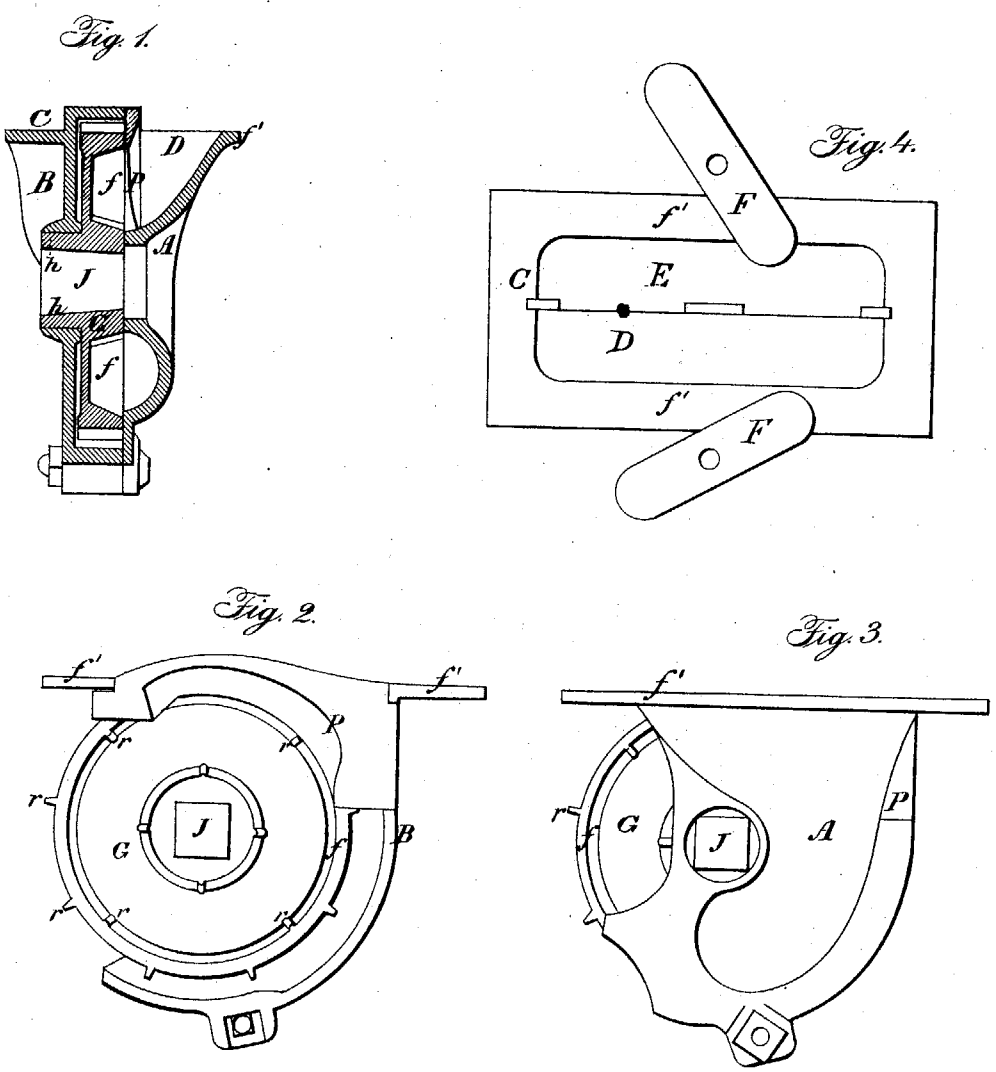
Witnesses:
Ira A Hebbard
A H Billing
Inventor:
Gilbert Jessup
By Wm S Loughborough Atty.
H. G. & C. P. Brown Assignee
AM. PHOTO-LITHO. CO. N.Y. (OSBORNE'S PROCESS.)

UNITED STATES PATENT OFFICE.

HIRAM L. BROWN AND CALVIN P. BROWN, OF SHORTSVILLE, NEW YORK, ASSIGNEES OF GILBERT JESSUP.

IMPROVEMENT IN SEEDING-MACHINES.

Specification forming part of Letters Patent No. 32,627, dated June 25, 1861; Reissue No. 2,782, dated October 22, 1867.

*To all whom it may concern:*

Be it known that GILBERT JESSUP, of Chapinville, in the county of Ontario and State of New York, has invented certain new and useful Improvements in the Construction and Mode of Operation of the Grain-Distributers of Seeding-Machines; and we do hereby declare that the following is a full, clear, and exact description thereof, reference being had to the accompanying drawings, making part of this specification, in which—

Figure 1 is a vertical central section. Fig. 2 is an elevation of the right-hand side of Fig. 1, with the casing A removed. Fig. 3 is a face view of the distributer complete. Fig. 4 is a top view.

Like letters indicate corresponding parts in the several views.

These improvements relate to the class of seeding-machines shown in the Letters Patent granted to Newton Foster, Gilbert Jessup, Hiram L. Brown, and Calvin P. Brown, on the 4th day of November, A. D. 1851, in which the grain is conveyed from the seed box or hopper to the drill-teeth by means of a revolving distributing-wheel, and are intended to obviate some of the objections found in practice to the working of these machines.

This invention consists in adapting the machine to the use of grain of different sizes by so constructing the wheel that the grain may be carried either over the periphery of the wheel or through a channel formed in the side of the wheel below the flange forming the periphery; in so constructing the casing of this wheel that the grain may be fed to either the larger or smaller opening alternatively; in the mode of hanging the wheel upon its shaft loosely and supporting it on the casing, so as to avoid the danger of crushing the grain while being fed to the drill-teeth from the hopper; in placing the wheel and casing below and attaching them to the hopper; in the mode of constructing the casing, and in constructing the flange of the wheel so that by means of irregularities upon their surfaces the grain shall be carried, with the revolution of the wheel, from the hopper to the drill-teeth.

The following description will enable persons skilled in the art to apply his improvements.

The distributing-wheel G is inclosed in a casing formed in two parts, A and B, constructed with flanges $f'$ for attaching them to the bottom of the hopper, said flanges being flush with its inner surface. The mouth of the casing is divided into two parts by a partition, P, extending downward to a distance sufficient to form, in connection with the wheel G, two openings, through either of which grain may be fed alternatively, the other being closed by a cover, E. In the case shown the smaller grain is intended to be fed over the periphery of the wheel G and through a channel formed between it and the casing; the larger grain through a channel formed between the casing and the side of the wheel. To permit this arrangement, the wheel is constructed with a flange, $f$, perpendicular to the plane of the wheel, the external surface of which forms the periphery of the wheel, and the lower or internal surface forms one side of a recess formed in the side of and extending around the wheel, which, in combination with a similar recess in the casing, forms a channel through which the larger grain may be fed from the hopper. The exterior and interior surfaces of the flange $f$ may be roughened, so as to catch the grain and carry it with the revolution of the wheel. Both the channels thus formed are converging, the orifice in the one being smaller than that of the other, so that one may be used for small and the other for large grain.

In the original machine the wheel was rigidly attached to a round shaft, and the grain was liable to be crushed by being wedged between the wheel and the casing. To remedy this objection, he proposes to hang the wheel G loosely upon a shaft, which shall be of any form other than round, so that while the wheel must turn with the revolution of the shaft, it may have sufficient play to yield to the pressure of the grain, and not injure it. To this end the wheel is constructed with a hub or boss, $h$, on one side, fitting into a recess formed in the casing against which it bears, the wheel simply turning with the shaft while resting upon its hub within the recess, by which it is adjustably supported so as to allow it the "play" necessary to avoid injury to the grain. The opening J is adapted to the form of the shaft, but larger than the shaft sufficiently to permit this play.

What we claim as his invention, and desire to secure by Letters Patent, is—

1. The wheel G of the vertical-disk distributers of seeding-machines, when constructed with a rim or flange, *f*, for carrying the grain over the wheel from the hopper to the drill-teeth.

2. So constructing and arranging the distributing-cases and wheel in this class of seed-drills that either of two openings, H and D, may be used alternatively for feeding different kinds of grain, substantially as described.

3. So constructing and combining the distributing-wheel G and casing A B that the grain may be carried by the wheel from either of the two openings C and D and discharged through channels of different sizes, adapted to larger or smaller grain, substantially in the manner set forth.

4. The mode, substantially as set forth, of giving the requisite play to the wheel G by hanging it loosely on a shaft not round and supporting it on the casing by means of a hub or boss.

5. So constructing the exterior or interior faces of the flange *f* that by means of irregularities upon the surface thereof the grain may be carried with the revolution of the wheel, substantially in the manner set forth.

6. The combination of the casing A and B, distributing-wheel G, and partition P, substantially as and for the purpose set forth.

7. The casing A B, constructed in two pieces, with horizontal flanges *f'* for attaching it to the hopper, when used in combination with a vertical distributing-wheel, G, substantially in the manner set forth.

GILBERT JESSUP.
By HIRAM L. BROWN,
CALVIN P. BROWN,
*Assignees.*

Witnesses:
N. K. COLE,
JANE A. COLE.